United States Patent [19]

Saccomanno et al.

[11] Patent Number: 4,807,979
[45] Date of Patent: * Feb. 28, 1989

[54] MICROSCOPE SLIDE MARKING DEVICE

[76] Inventors: Geno Saccomanno, 778 26 ½ Rd., Grand Junction, Colo. 81501; Paul O. Cary, 580 Stanford Way, Grand Junction, Colo. 81504

[*] Notice: The portion of the term of this patent subsequent to Sep. 1, 2004 has been disclaimed.

[21] Appl. No.: 46,575

[22] Filed: May 6, 1987

Related U.S. Application Data

[63] Continuation-in-part of Ser. No. 821,953, Jan. 24, 1986, Pat. No. 4,690,521.

[51] Int. Cl.$^4$ .................. G02B 7/02; G02B 15/02; G01B 5/14; B23B 49/02
[52] U.S. Cl. ........................................ 350/520; 33/666
[58] Field of Search ................ 33/666, 670, 677, 678, 33/679, 579, 495; 350/507, 520

[56] References Cited

U.S. PATENT DOCUMENTS

| | | | |
|---|---|---|---|
| 1,129,742 | 2/1915 | Sheaff | 350/507 |
| 2,364,497 | 8/1943 | Wahnish et al. | 33/677 |
| 2,429,517 | 10/1947 | Knapp | 33/495 |
| 2,478,347 | 8/1949 | Warrington | 33/495 |
| 2,582,898 | 1/1952 | Baldwin | 33/579 |
| 2,803,208 | 8/1957 | Bernard et al. | 33/495 |
| 3,153,860 | 10/1964 | Sidlauskas | 33/677 |
| 4,262,426 | 4/1981 | Miyazaki | 350/321 |
| 4,690,521 | 9/1987 | Saccomanno | 350/520 |

Primary Examiner—Bruce Y. Arnold
Assistant Examiner—Terry S. Callaghan

[57] ABSTRACT

A marking assembly is disclosed for making reference marks on a microscope slide. The marking assembly includes a mounting ring having two clamping flats and an extensible clampbar for compressive attachment to a microscope lens objective. Replaceable ink cartridge having a marking nib mounted near its distal end is inserted in a plunger mechanism that may be selectively activated to cause the nib to mark the slide. The plunger mechanism is pivotably mounted to the mounting ring by two orthogonally oriented pivot pins which allow the plunger mechanism and nib to be selectively positioned about both vertical and horizontal axes so that the reference mark can be selectively positioned on the microscope slide. A plurality of calibration screws and springs are provided to position and lock the plunger mechanism in place when the desired vertical and horizontal positions have been selected. The plunger mechanism may be manipulated to vary the size of the reference mark.

36 Claims, 3 Drawing Sheets

MICROSCOPE SLIDE MARKING DEVICE

This application is a continuation-in-part of application Ser. No. 06/821,453, filed Jan. 24, 1986, now U.S. Pat. No. 4,690,521 entitled "Microscope Slide Marking Device and Method", the subject matter of which is incorporated herein by reference.

BACKGROUND OF THE INVENTION

The present invention relates generally to a system for reference marking objects of interest during the scanning of microscope slides. More particularly, the present invention relates to an attachment for a lens objective capable of reference marking objects of interest on a microscope slide that allows the user great flexibility in selecting the size of the mark and the location of the mark within the field of view.

During scientific research and inspection work involving microscopic examination of various substances such as tissue cultures, blood cells, and the like, a microscope slide is initially scanned at a lower power of magnification. The slide is scanned for the purpose of noting specific objects of interest requiring further study under greater powers of magnification. When such objects of interest are located, it is desirable to reference mark these objects on the slide for further detailed study after the slide has been fully scanned. Such reference marking greatly reduces the amount of time involved in relocating the specific detail at any given time in the future.

The reference marking of microscopic slides has been used in general for quite some time. For many years, and to some extent even today, objects of interest on microscope slides are reference marked by hand methods, which are time consuming, inconsistent and sometimes inaccurate. It is highly desirable to have the capacity to place each reference mark in the consistently same position relative to the optical centerline or axis of the microscope and relative to each associated object of interest on the microscope slide. The use of such consistently positioned and consistently sized reference marks allows the microscopist to readily return to any object of interest after locating the associated reference mark. Prior art hand techniques and their inherent inconsistency makes the return to an object of interest more difficult and time consuming once the reference mark has been located.

A significant advance in the microscope slide reference marking art involves automated microscopy systems and methods. Generally with such automatic analysis systems, a microscope slide is initially scanned, and an image of the slide substance configuration is generated by a computer. This image is then processed to determine, or extract, various features of the scanned slide. Based on these identified features, the slide material is classified by the system. Records of identified objects of interest are stored in a computer memory so that they may be subsequently relocated for further visual analysis based on computer memorization of the slide location of the object of interest. Such systems obviously require very sophisticated and expensive electronic and computer equipment first to mark the slide by electronic means and then to relocate any desired object of interest. While such computerized systems are extremely effective and accurate, they are also extremely expensive to own and operate. Oftentimes, the scientific researcher simply cannot afford such expensive equipment, or such equipment is not cost effective for the research being conducted. Thus, the standard hand marking techniques have continued to be utilized on a frequent basis.

A more eloquent approach to microscope slide reference marking is taught by Miyazaki in U.S. Pat. No. 4,262,426. Miyazaki discloses a marker assembly that attaches to a lens objective. A cylindrical housing is slipped about the lens objective and is secured thereto by a set screw. Once an object of interest is located, a plunger having a marking piece located on its distal end is activated, thereby leaving an appropriate reference mark on the slide. However, the device taught by Miyazaki has several drawbacks as well. To begin with, since the cylindrical housing is of a fixed size, the marker assembly would be unusable if the lens objective is larger than the housing. Similarly, if the lens objective is significantly smaller than the housing, the set screw would not provide a stable foundation, and therefore the location of the marks would tend to be less precise. Additionally, the set screw mounting mechanism would be inappropriate for attachment to lens objectives that have a threaded exterior and would induce wobble. The marker assembly taught by miyazaki also has numerous drawbacks that stem from its lack of adjustability. The user has little or no control over the location, orientation and size or the marks made.

Consequently, there is a need for a microscope slide marking device that is accurate, inexpensive, easy to use, and readily adjustable for usage with a wide variety of microscopes, and yet is still readily adjustable by the user to allow great flexibility in selecting both the size and location of the reference mark. Such a device should also be located totally outside the field of view of the microscope, except when the reference mark is applied to the slide, so as to facilitate unobstructed scanning of the slide.

Accordingly, to achieve the foregoing and other objects and in accordance with the purposes of the present invention, as embodied and described herein, a marking device is provided for making reference marks on a microscope slide.

The device includes a mounting member for attaching the marking device to a microscope's lens objective. The mounting member possesses a self-centering arrangement having two clamping flats and an extensible clampbar disposed at spaced locations around the interior surface of an annular ring.

The device further includes a plunger mechanism preferably pivotably mounted to the mounting member via two pivot pins which allow the plunger mechanism and an associated marking nib to be selectively positioned in both the vertical and horizontal planes relative to the slide being observed. Once the desired horizontal and vertical positions of the plunger mechanism are selected, the plunger mechanism is locked into place by means of set screws. The marking nib is mounted near the distal end of a replaceable cartridge which is inserted into the plunger mechanism, whereby the plunger mechanism may be selectively activated to cause the nib to place a mark on the slide in a variable preselected position relative to an object of interest located and found on the slide. Also the size of the mark may be selectively varied by adjusting the limits of the plunger action.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings in which

DETAILED DESCRIPTION OF THE PREFERRED EMBODIMENTS

Figure 1:
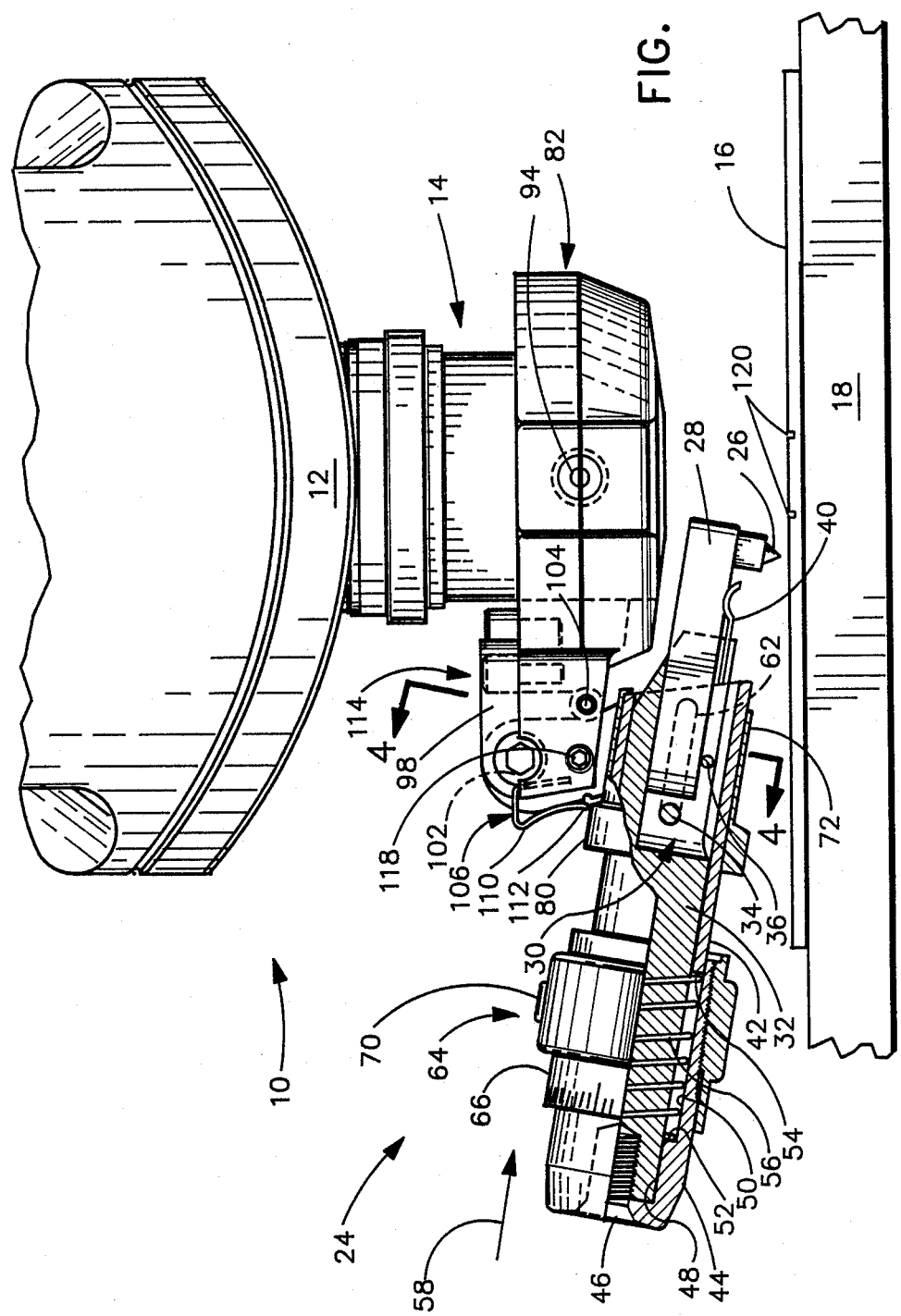
FIG. 1 is a side perspective view, with some parts in section, of a microscopy system incorporating the reference marking device of the present invention.

Referring initially to FIG. 1, a microscope 10 includes lens turret system 12 which is adapted for carrying a plurality of magnifying lens systems known as lens objectives thereon. Each of these lens objectives, of which only one is illustrated in FIG. 1, is designed to provide a distinct level of magnification. In the illustrated embodiment, objective 14 is known as a scanning objective. Typically, a scanning objective will have sufficient magnification to permit some observation of the specimen on microscope slide 16 so as to identify various objects of interest, but would not normally be so powerful as to allow detailed study of such objects. Typically, a microscope slide 16 is mounted on a microscope stage 18 which is capable of being moved in two orthogonally aligned directions 20 and 22 in the horizontal plane (see FIG. 2). In this manner, the microscope slide 16 may be scanned from side to side bidirectionally along arrow 20 and up and down bidirectionally along arrow 22. As an object of interest is located within the viewing area of the slide 16, a marker assembly according to the present invention is used to leave a visible reference mark of predetermined, selected size on the slide 16 at a predetermined, selected location relative to the object of interest. After such a reference mark is made, the user of the microscope 10 may continue scanning the slide 16 for other objects of interest which are similarly reference marked utilizing the marker assembly. Once such objects of interest have been located and the slide 16 has been fully scanned, the objects of interest may then be readily relocated for further detailed study at higher magnification. Such objects of interest may be readily identified and relocated as a result of the visible reference marks made on the slide by the marker assembly.

Figure 2:
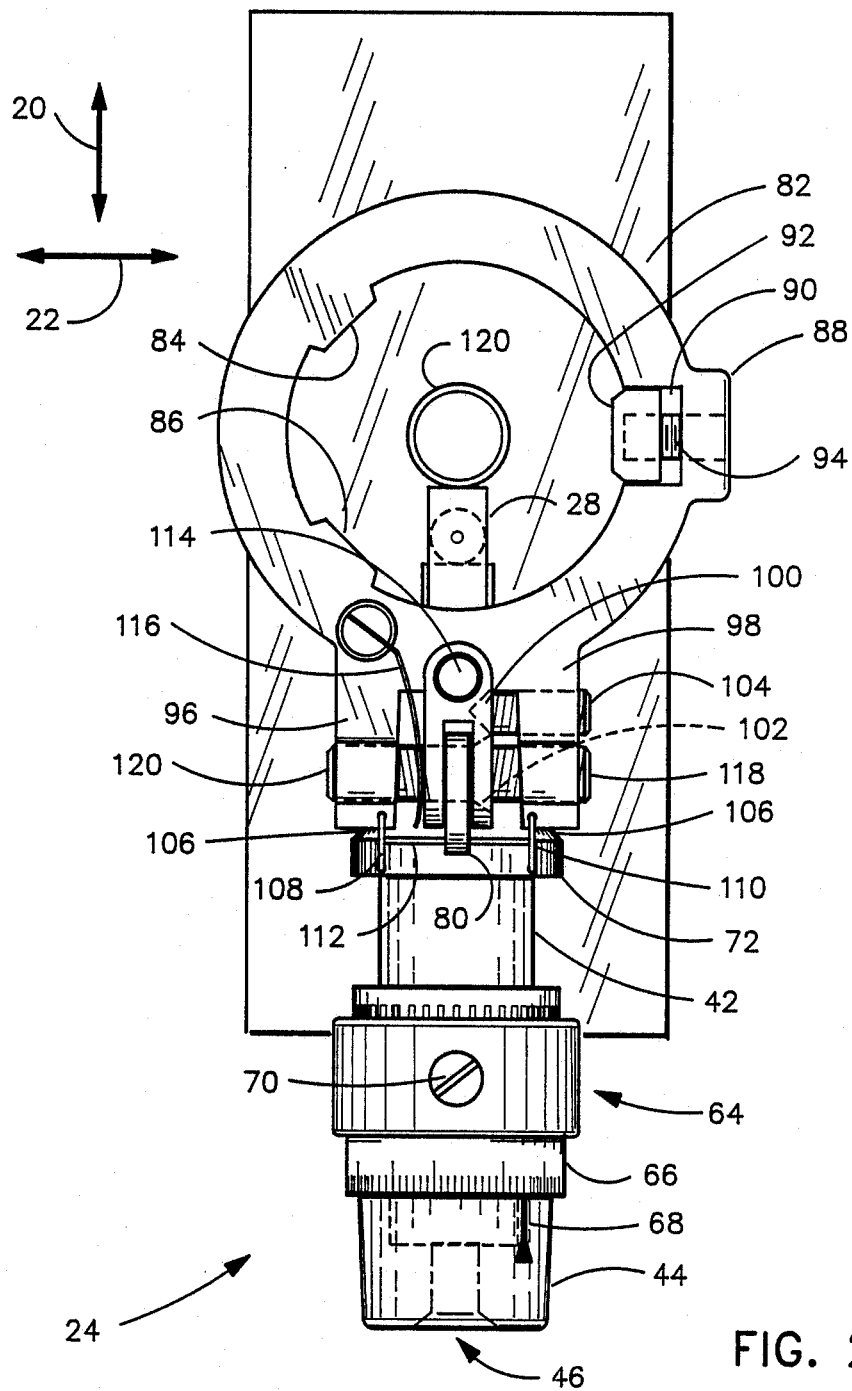
FIG. 2 is a top plan view of the reference marking device illustrated in FIG. 1.
Figure 3:
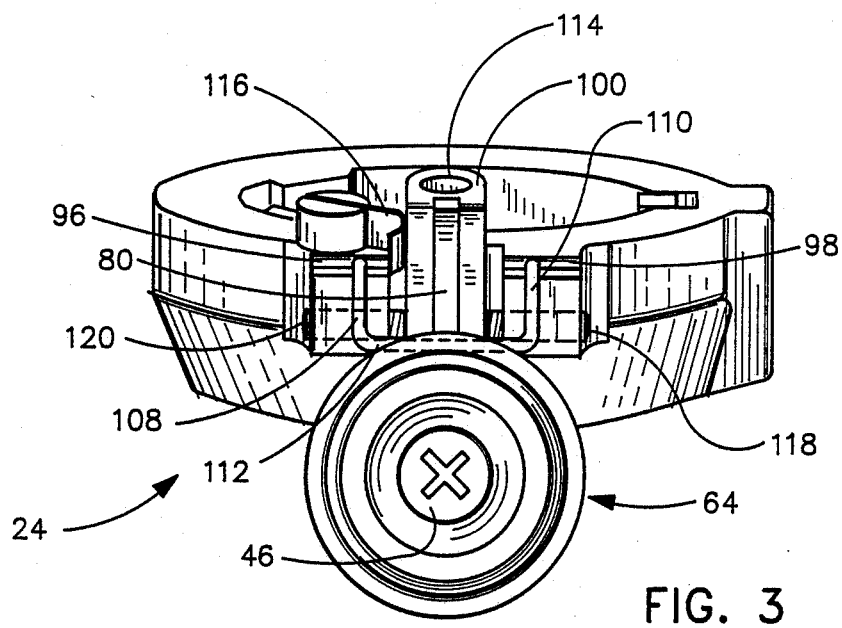
FIG. 3 is a rear perspective view of the device illustrated in FIG. 2.

Referring now to FIGS. 1-3, the preferred marker assembly 24 includes a marking nib 26 mounted on a marker cartridge 28. The nib 26 is positioned so as to contact the slide 16 and leave a small, visible reference mark when the marker assembly 24 is activated. Marker cartridge 28 preferably carries an ink cartridge capable of supplying liquid ink to the tip of nib 26.

Marker cartridge 28 is preferably closely slip fit within cavity or bore 30 disposed longitudinally within central cylindrical piston 32. Cartridge 28 possesses an essentially square cross-sectional profile in the embodiment illustrated in the drawings, although it should be understood that cartridge 28 could easily be adapted to house different forms of cartridges such as those having circular or triangular cross-sections.

Figure 4:
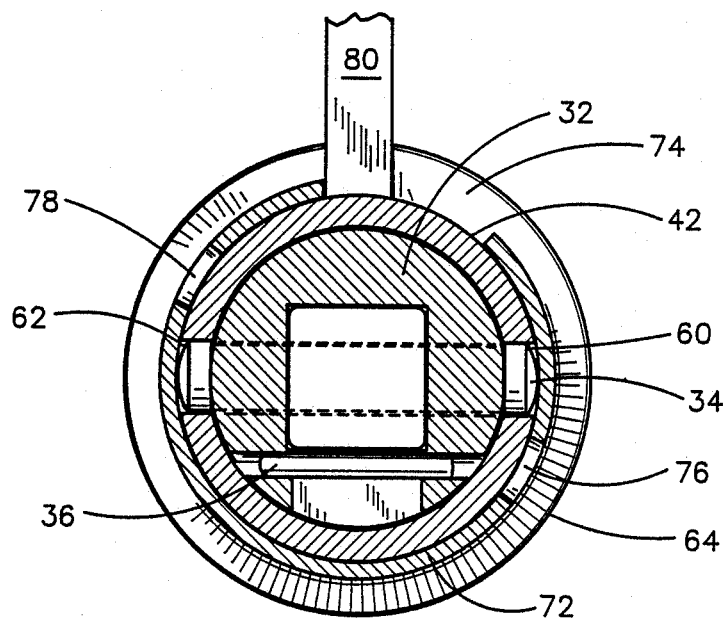
FIG. 4 is a cross-sectional view of the plunger mechanism taken substantially along line 4—4 of FIG. 1.

As can be best understood by reference to FIGS. 1 and 4, to insure that cartridge 28 is accurately positioned and maintained within piston 32, a pair of guide pins 34, 36 are mounted within piston 32 and extend laterally across cavity 30. A first guide pin or stroke-pin 34, which has additional functions to be explained below, is designed to abuttingly contact the end of cartridge 28 remote from nib 26, thereby affirmatively limiting the distance and extent to which cartridge 28 may be inserted into cavity 30. Similarly, a second guide pin or cartridge locating pin 36 is designed to abuttingly contact the bottom surface of cartridge 28 such that the top surface of cartridge 28 lies abutting against surface of piston 32 defined by the upper portion of cavity 30. Cartridge latch spring 40 comprises a leaf spring that extends forward from the distal end of piston 32 and is designed to abut the bottom surface of cartridge 28 to bias the same in an upward direction. The extending end of cartridge latch spring 40 is bowed to mate in a snap fitting engagement with a correspondingly bowed indentation on the bottom surface of cartridge 28. Thus, the cartridge latch spring 40 resiliently biases and maintains cartridge 28 in a particular position and alignment with the piston 30 during use.

When the ink is depleted from the ink cartridge within cartridge 28, one simply pulls the cartridge 28 longitudinally away from piston 30. The pulling force is sufficient to move cartridge latch spring 40 out of snap fitting engagement with the corresponding indentation in cartridge 28 so that the cartridge 28 can be disengaged from the piston 32 and replaced with a similar cartridge 28 having a nib 26 and filled with an appropriate supply of ink. It should be appreciated that stroke-pin 34, cartridge locating pin 36, and cartridge latch spring 40 cooperatively act to position, register, and releasably latch cartridge 28 with respect to piston 32.

Disposed circumferentially about the forward end of piston 32 is plunger tube or barrel 42, which is sized and shaped so as to snugly receive piston 32, yet permit it to move axially therewithin. The external diameter of piston 32 is only very slightly smaller than the internal diameter of plunger barrel 42. Disposed about the rearward portion of the piston 32 is a plunger sleeve 44, which is threadably secured to the rear end of the piston 32 by a flat head screw 46 so as to move axially in conjunction with piston 32. Plunger sleeve 44 is fashioned in the form of a hollow cylinder having two stepped interior cylindrical surfaces. The first inner cylindrical surface 48 is disposed toward the rearward end of plunger sleeve 44 and is sized and shaped to snugly receive the piston 32. The external diameter of piston 32 is only very slightly smaller than the internal diameter of the first inner cylindrical surface 48. The second inner cylindrical surface 50 is positioned toward the forward end of plunger sleeve 44, and has a diameter significantly greater than that of first inner cylindrical surface 48 so as to be spaced from the periphery of piston 32. In this manner, the juncture between the surfaces 48 and 50 forms an interior lip 52, the purpose of which will be described in detail below. The forward end of the plunger sleeve 44 partially overlaps the rear end of plunger barrel 42 such that the rear end of plunger barrel 42 forms another interior lip 54 spaced opposite from the lip 52.

A coiled helical return spring 56 is disposed about the central portion of piston 32 within the annular space between piston 32 and second inner cylindrical surface 50 of plunger sleeve 44. Return spring 56 is sized and shaped so that its ends abut the opposing interior lips 52 and 54 whereby plunger sleeve 44 rests in the position illustrated in FIG. 1 and nib 26 is maintained out of contact with slide 16. When it is desired to place a reference mark on the slide 16, a force sufficient to overcome the bias of return spring 56 is applied in the direction of arrow 58 to the rear end of plunger sleeve 44 until nib 26 contacts the slide 16 thereby making a reference mark. When such force ceases to be applied, return spring 56 forces plunger sleeve 44 to move oppositely to the longitudinal direction indicated by the arrow 58 so as to return plunger sleeve 44 to the position illustrated in FIG. 1. It will thus be appreciated that plunger sleeve 44, piston 32, cartridge 28, and nib 26 longitudinally translate in unison, while plunger barrel 42 remains stationary. In order to facilitate such relative translation, plunger barrel 42 is provided with a pair of longitudinal slots 60, 62 to receive a corresponding end of stroke pin 34, as best shown in FIGS. 1 and 4. Longitudinal slots 60, 62 extend far enough along plunger barrel 42 to insure that the translation of piston 32 is sufficient to permit the reference mark to be made, however, at the same time, the abutment of stroke pin 34 with the reward ends of slots 60, 62 limits the rearward translation of piston 32. The interaction of stroke-pin 34 and slots 60, 62 further serves to prevent rotation of plunger sleeve 44, piston 32, cartridge 28 and especially nib 26 relative to plunger barrel 42.

The longitudinal axis of plunger sleeve 44, piston 32, and cartridge 28 normally is inclined at an angle in the range of 5 to 20 degrees, and preferably about 10 degrees relative to microscope stage 18.

In order to adjust the size of the reference mark made by the nib 26, a micro-calibrator 64 is provided. In preferred form, micro-calibrator 64 is threadably secured about the outside periphery of plunger sleeve 44 and is longitudinally disposed about the portion of plunger sleeve 44 closest to plunger barrel 42. Micro-calibrator 64 includes a rearwardly extending annular dial 66 having a series of circumferentially spaced graduation markings to permit a readily visual determination of the longitudinal position of micro-calibrator 64 relative to plunger sleeve 44. Such determination can be made by comparing the position of the graduation markings relative to reference line 68 on the top surface of plunger sleeve 44. Friction set screw 70 extends laterally through micro-calibrator 64 to provide suitable friction with plunger sleeve 44 to such a degree that micro-calibrator 64 will threadably rotate about plunger sleeve 44 with a small rotational force, but will maintain a desired longitudinal position and will not rotate unless such force is applied.

A retainer tube 72 possessing an enlarged abutment surface at its rearward end slips snugly over plunger barrel 42. The abutment surface of retainer tube 72 is adapted to selectively abut the forward end of micro-calibrator 64 when the plunger sleeve 44, piston 32, cartridge 28 and nib 26 are longitudinally translated in the direction of arrow 58, thereby limiting the longitudinal translation of plunger sleeve 44, piston 32, cartridge 28 and especially nib 26. The size of the reference mark made by nib 26 on the microscope slide may be selected and adjusted as follows. First, the micro-calibrator 64 is rotated to a position such that the nib 26 is spaced only very slightly above the slide 16 when the abutment surface of retainer tube 72 contacts the forward end of micro-calibrator 64. Then the micro-calibrator 64 is rotated such that the nib 26 contacts the slide 16 when the abutment surface of retainer tube 72 is spaced from and out of contact with the forward end of micro-calibrator 64 and such that further translation of the plunger sleeve 44, piston 32, cartridge 28 and nib 26 (i.e., the plunger mechanism) in the direction of arrow 58 causes the nib 26 to move across the surface of slide 16 in contact therewith. Thus, by rotating the micro-calibrator 64 and thereby changing its longitudinal position relative to plunger sleeve 44, the length of the reference mark can be varied, adjusted and selected.

As may best be understood with reference to FIGS. 1 and 4, retainer tube 72 possesses a relatively wide slot 74 longitudinally extending from the large abutment surface thereof through the forward end thereof and a pair of oppositely, laterally aligned apertures 76, 78, each having a diameter slightly larger than the diameter of stroke-pin 34. A fin 80 is integrally formed with and extends radially upward from plunger barrel 42 through the longitudinal slot 74. Since longitudinal slot 74 is substantially wider than fin 80, retainer tube 72 is capable of limited rotation about its longitudinal axis in either a clockwise or a counter clockwise direction. The rotation of retainer tube 72 about plunger barrel 42 is facilitated by providing a detent mechanism comprising a dish-shaped depression or socket within a shallower track on the outer surface of plunger barrel and a bulbous protrusion on the inner surface of retainer tube conforming to the shape of the socket and the track. The bulbous protrusion is adapted to selectively glide within and along the track compressively against the outer surface of plunger barrel 42 and to selectively rest within the socket. The bulbous protrusion rests within the socket when retainer tube 72 and plunger barrel 42 are in the position shown in FIG. 4, but by slightly, forcefully rotating retainer tube 72 relative to plunger barrel 42 the bulbous protrusion will move out of the socket and glide within and along the track, the track being configured such that the retainer tube may be rotated to a position where apertures 76, 78 align with stroke pin 34. Naturally, retainer tube 72 may be rotated so that the bulbous protrusion moves back to a resting position within the socket. Thus, the rotation of retainer tube 72 permits the selective alignment of apertures 76, 78 with stroke pin 34, thereby permitting removal of stroke pin 34, which in turn permits the complete disassembly of plunger barrel 42 and piston 32 as well as all of the other aforementioned components of the marking device. The components of course may be reassembled by a reverse procedure. This disassembly feature facilitates proper maintenance including cleaning, repair or replacement of components, and proper lubrication of moving parts.

The means for mounting the aforementioned marking assembly components to the microscope will now be described. A mounting ring 82 is adapted to surround the microscope's lens objective 14. Mounting ring 82 includes a pair of circumferentially spaced clamping flats 84, 86 protruding radially inward from the interior surface thereof. Clamping flats 84, 86 are disposed about the interior surface of mounting ring 82 in the range of 60 to 120 degrees, and preferably 90 degrees, arcuately apart. Mounting ring 82 also includes boss 88 which protrudes radially outward from the exterior surface of mounting ring 82 and is preferably substantially arcuately equidistant from the clamping flats 84, 86. Recess 90 is formed on the interior surface of mounting ring 82 directly opposite to boss 88. Wedge-shaped retracting clampbar 92 is extensibly connected to mounting ring 82 by clampscrew 94, which extends radially through a threaded aperture in boss 88. Clampbar 92 is substantially disposed within recess 90 when withdrawn and may be extended from or retracted in recess 90 merely by turning clampscrew 94.

The spacing of clampbar 92 and clamping flats 84, 86 results in a V-block locating effect when clamping the mounting ring 82 to lens objective 14. This V-block locating effect has several advantages. First, it causes the mounting ring 82 to be substantially self-centered along the longitudinal axis of lens objective 14, and second, the plane of mounting ring 82 will be substantially parallel to microscope slide 16 and orthogonal to the optical axis or centerline of the microscope. The V-block effect also provides even clamping pressure along the three line contact points, thereby allowing the mounting ring 82 to be used on lens objectives having threaded exteriors without causing damage to the threads and without distorting the lens objective housing and the optical components therein. Additionally, the V-block design allows the mounting ring 82 to be readily and securely fastened to lens objectives of significantly varying sizes, thereby permitting its use with a wide variety of microscope brands and designs.

To attach the mounting ring 82 to lens objective 14, clampscrew 94 is turned so that clampbar 92 is retracted within recess 90 sufficiently far to allow mounting ring 82 to slide up and around lens objective 14. When the bottom of mounting ring 82 is approximately flush with the bottom of lens objective 14, clampscrew 94 is tightened, thereby forcefully extending clampbar 92 to securely engage lens objective 14, which in turn causes clamping flats 84, 86 also to securely engage lens objective 14. The mounting ring 82 may be rotated and secured to lens objective 14, at any arcuate position, thereby providing a full 360 degree position capability of mounting ring 82 relative to lens objective 14 of the microscope 10.

A pair of substantially parallel, spaced mounting ears 96, 98 extend substantially radially outward from the mounting ring 82 at an arcuate location approximately 90 degrees from boss 88. A clevis 100 is loosely confined between mounting ears 96, 98. Clevis 100 possesses a pair of spaced, parallel arms between which fin 80 is sandwiched. Fin 80 and each of the clevis arms are provided with aligned apertures adapted to receive pivot pin 102 horizontally therethrough. Pivot pin 102 preferably comprises either a flathead cap screw or a non-threaded pin having a thin, flat head. In this manner, fin 80 may be rotated about pivot pin 102 thereby causing nib 26 to rotate within a vertical plane. Once the desired vertical position of nib 26 is selected, fin 80 is locked into place relative to clevis 100 so that further rotation of fin 80 about pivot pin 102 is prevented.

The rotational position of fin 80 relative to clevis 100 may be selected and adjusted by means of vertical calibration screw 104 working in conjunction with vertical calibration spring 106. Vertical calibration screw 104 possesses a conical tip and is threadably engaged with, and extends horizontally through, mounting ear 98 such that the forward edge of fin 80 rests against the conical tip. Thus, the extension of the conical tip of vertical calibration screw 104 limits the forward rotational position of fin 80, which in turn also limits the forward rotational position of nib 26.

Vertical calibration spring 106 is provided to bias fin 80 toward the conical tip of vertical calibration screw 104. Vertical calibration spring 106 includes a pair of spaced compression pressure bars 108, 110 integrally connected at their lower ends by a horizontal bar 112, as best shown in FIGS. 1 and 2. The upper end of each compression pressure bar 108, 110 plugs into a closely fitting vertical hole located in corresponding mounting ears 96, 98. Horizontal bar 112 rests against the rearward edge of fin 80, thus imposing a forward or counter-clockwise (as viewed in FIG. 1) pressure on fin 80, which assures the abutment of the forward edge of fin 80 against calibration screw 104. Consequently, vertical calibration screw 104 can be turned to adjust, vary and select the rotational position of fin 80 and in turn the rotational position of nib 26 in a vertical plane.

Clevis 100 is secured to mounting ring 82 by pivot pin 114 threadably secured to the top surface of mounting ring 82 arcuately midway between mounting ears 96, 98. Pivot pin 114 extends upwardly through a corresponding hole in clevis 100 such that clevis 100 is rotatable about a vertical axis. The angular rotation of clevis 100 is limited by the mounting ears 96, 98. This arrangement permits rotation of nib 26 in a horizontal plane.

Horizontal calibration spring 116 works in conjunction with horizontal calibration screw 118 and locking screw 120, to secure nib 26 in a chosen horizontal position. Locking screw 120 and horizontal calibration screw 118 are threadably connected with substantially aligned, horizontal apertures in a corresponding one of mounting ears 96, 98. Thus, when calibration screws 118 and 120 are withdrawn, the plunger assembly is free to swing horizontally within the confines of mounting ears 96 and 98. Horizontal calibration spring 116 comprises a leaf spring, one end of which is attached to the top of mounting ring 82 near mounting ear 96. The free end of horizontal calibration spring 116 rests against clevis 100 whereby clevis 100 is biased toward horizontal calibration screw 118 within mounting ear 98. When the pivot pin 102 comprises a non-threaded pin having a thin, flat head, the free end of horizontal calibration spring 116 rests against the pin head to help retain the pin in a position of extension through the clevis arms and fin 80.

To adjust the horizontal position of nib 26, first locking screw 120 is retracted so that horizontal calibration spring 116 forces clevis 100 to rest against horizontal calibration screw 118. By turning horizontal calibration screw 118, the horizontal position of nib 26 is adjusted and varied to a desired position, and then locking screw 120 is turned until it abuts clevis 100, thereby locking the horizontal position of nib 26. The locking action provided by screws 118 and 120 is important to insure that the user will not accidentally alter the horizontal position of marking nib 26. It should also be noted that the locking action resultant from tightening locking screw 120 also exerts a closing pressure on clevis 100 thereby causing the clevis arms to forcefully sandwich fin 80, which has the effect of frictionally locking the vertical position of nib 26 as well.

Thus, the vertical and horizontal position of nib 26 may be readily adjusted, varied and selected. Through the combined movements allowed by rotation of mounting ring 82 about lens objective 14, of clevis 100 about pivot pin 114, and of fin 80 about pivot pin 102, nib 26 may be positioned to any desired location above slide 16.

To install the reference marking device of the preferred embodiment of the present invention, the focusing ram of the microscope is first withdrawn upwardly, away from the microscope stage 18. Then, a special microscope slide 16 called a calibrating slide is mounted on the microscope stage 18. The calibrating microscope slide 16 possesses an etched calibration reference circle 120 on its upper surface, as best shown in FIGS. 1 and 2. Next, mounting ring 82 is slipped around lens objective 14 so that the bottom edge of mounting ring 82 is flush with the bottom edge of lens objective 14. Then, the mounting ring 82 is rotated about the lens objective 14 such that the marker assembly attached thereto, generally comprising the plunger sleeve 44, piston 32, cartridge 28, and nib 26, is rotated to provide the preferred radial position of the marker assembly to accommodate the personal preference of the scientist (such as whether the scientist is right handed or left handed), to permit the marker assembly to extend between the other lens objectives of the microscope, and to avoid a collision between the marker assembly and the microscope column or neck as the turret 12 is rotated. The mounting ring 82 is then clamped to lens objective 14 by tightening clampscrew 94.

When the mounting ring 82 is mounted on the lens objective 14, the focusing ram of the microscope is moved downwardly toward the microscope stage 18 bringing into focus any part of the calibration reference circle 120 on the calibrating microscope slide. Then the calibration reference circle 120 is centered within the field of view of the microscope. Thereafter, plunger sleeve 44 is depressed forwardly so that nib 26 just touches, and makes a small mark on, the calibrating microscope slide. Next, locking screw 120 is withdrawn completely into mounting ear 96, and then horizontal calibration screw 118 is turned, thereby moving nib 26 generally in the direction of arrow 22 (as shown in FIGS. 1 and 2) until the desired position of reference mark produced by nib 26 is obtained. Then, vertical calibration screw 104 is turned so that nib 26 is moved in the direction of arrow 20 (as shown in FIGS. 1 and 2) until the desired position of the reference mark is obtained. Lastly, locking screw 120 is turned so as to forcefully engage clevis 100, thereby locking the position of nib 26 and the position of the reference mark made by marking nib 26. It will thus be appreciated that the position of nib 26 can be varied to make a reference mark on microscope slide 16 any distance from and any radial position with respect to the optical center line or axis of the microscope and at any location on the microscope slide within the microscope field of view.

The size of the reference mark on the calibrating microscope slide is next adjusted and selected. The plunger sleeve 44 is gently depressed forwardly so as to move nib 26 to position where the nib 26 is only very slightly away from the upper surface of calibrating microscope slide. The micro caliber 64 is then rotated so that the forward edge thereof abuts the rearward edge of retainer tube 72. Next, the micro caliber 64 is rotated so as to leave a small gap between the forward edge thereof and the rearward edge of the retainer tube 72. The size of such gap is directly proportional to the size of the reference mark that will be made by nib 26 on the microscope slide.

The calibrating microscope slide is then replaced by a microscope slide 16 containing the specimen of interest.

As a result of the above invention, the microscopist can focus the chosen lens objective and scan the microscope slide 16 for objects of interest. When a specific detail or object of interest is located, its location can be immediately reference marked by depressing plunger sleeve 44. Quick, deliberate marks can be made without the microscopist having to take his eyes from the field of view. The field of view is unobstructed by the reference marking device except briefly when the plunger sleeve 4 is depressed to reference mark the slide. The microscopist can readjust the size of the reference marks to his particular preference by simply adjusting the micro caliber 64. Once the entire slide 16 has been scanned, the microscopist can easily and quickly return to any desired object of interest for detailed study due to the accuracy, precision and rigidity of the reference marking device. Moreover, at any time during the course of scanning slide 16, it may be desirable to view a specific object of interest in greater detail under higher magnification. To accommodate a more detailed study, lens turret 12 is turned to an objective having greater magnification. After viewing the slide 16 under higher magnification, the turret 12 can be returned to the scanning lens objective 14 without losing the selected calibrations.

Any time the ink supply in the pen cartridge 28 is exhausted, it is readily and quickly changed even during scanning operations by simply removing the cartridge 28 and replacing it with a new one—all without changing or altering any of the calibrations.

As can be seen from the above, the present invention provides a simple yet effective and accurate method and device for reference marking microscope slides and objects of interest located thereon. The device is easy to install, calibrate and utilize, yet is inherently accurate over prolonged use and does not require expensive equipment either to operate or to read the reference marks left thereby.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What is claimed is:

1. A reference marking device for identifying objects of interest on a microscope slide while observing the objects of interest through the microscope, said device comprising:
   means for selectively placing a reference mark on said microscope slide;
   means for mounting said marking means to the microscope; and
   means for rotating said marking means about a substantially horizontal axis whereby said reference mark may be placed on said slide at a variable, preselected position.

2. A reference marking device as recited in claim 1 further comprising means for rotating said marking means about a substantially vertical axis whereby said reference mark may be placed on said slide at a variable, preselected position, such that said reference mark may be placed on said slide at any variable, preselected position.

3. A reference marking device as recited in claim 1 wherein said mounting means includes a pair of spaced apart mounting ears, wherein said marking means includes a substantially vertically disposed fin extending between said mounting ears, and wherein said rotating means includes means for rotating said fin relative to said mounting ears.

4. A reference marking device as recited in claim 1 further comprising means for biasing said marking means in a first rotational direction about the horizontal axis.

5. A reference marking device as recited in claim 1 further comprising means for selectively locking said marking means in a selected, variable position about the horizontal axis.

6. A reference marking device as recited in claim 1 further comprising means for selectively varying the size of the reference mark.

7. A reference marking device for identifying objects of interest on a microscope slide, said device comprising
means for selectively placing a reference mark on said slide; and
a mounting member adapted to mount said marking means to a magnifying objective of a microscope, said mounting member including,
(i) an annular ring adapted for disposition about the microscope objective,
(ii) an extensible clampbar, extensible inwardly from the interior side of said annular ring for tightly securing said mounting member to said objective,
(iii) a first clamping flat disposed on the interior side of said annular ring, and
(iv) a second clamping flat disposed on the interior side of said annular ring.

8. A reference marking device as recited in claim 1, wherein said first and second clamping flats are separated by an angle substantially in the range of 60 to 120 degrees, and wherein said first and second clamping flats are substantially equidistant from said extensible clampbar.

9. A reference marking device as recited in claim 1, wherein said first and second clamping flats are separated by an angle of substantially 90 degrees, and the angle between said first clamping flat and said extensible clampbar is substantially equal to the angle between said second clamping flat and said extensible clampbar.

10. A reference marking device as recited in claim 1 wherein said extensible clampbar includes a self-aligning head and a clampscrew.

11. A reference marking device as recited in claim 10 wherein said annual ring is provided with an interior recess and wherein said self-aligning head is retractable within said interior recess.

12. A reference marking device as recited in claim 1 wherein said annular ring is adapted to be mounted at any selected circumferential position about said microscope objective.

13. A reference marking device as recited in claim 1 further comprising:
means for rotating said marking means about a substantially horizontal axis;
means for rotating said marking about a substantially vertical axis; and
means for locking said marking means in selected rotational positions about the vertical and horizontal axes.

14. A reference marking device as recited in claim 1 further comprising:
means for rotating said marking means about a substantially vertical axis whereby said reference mark may be placed on said slide at a variable, preselected position.

15. A reference marking device as recited in claim 1 further comprising:
means for rotating said marking means about a substantially horizontal axis whereby said reference mark may be placed on said slide at a variable, preselected position.

16. A reference marking device as recited in claim 1 further comprising means for selectively placing a reference mark on said slide at a variable, preselected position relative to an object of interest located on said slide.

17. A reference marking device as recited in claim 1 further comprising:
means for rotating said marking means about a substantially vertical axis and about a substantially horizontal axis whereby said reference mark may be placed on said slide at any variable, preselected position.

18. A reference marking device as recited in claim 17 further comprising means for selectively varying the size of said reference mark.

19. A reference marking device as recited in claim 1 further comprising means for selectively varying the size of said reference mark.

20. A reference marking device for identifying objects of interest on a microscope slide, said device comprising:
a marking nib adapted to selectively place a reference mark on said slide;
a replaceable cartridge of standardized size containing a supply of marking material, said marking material in communication with said marking nib;
a housing for said cartridge;
means for mounting said cartridge within said cartridge housing in a fixed position; and
means for resiliently biasing said cartridge to maintain said cartridge in said fixed position.

21. A reference marking device as recited in claim 20 wherein said nib is mounted on said cartridge.

22. A reference marking device as recited in claim 20 wherein said cartridge is provided with an indentation and wherein said biasing means includes a spring configured and adapted to protrude into said indentation.

23. A reference marking device as recited in claim 20 wherein said reference marking device is adapted to be disposed outside the field of view of the microscope except when said marking means places a reference mark on said microscope slide.

24. A reference marking device for identifying objects of interest on a microscope slide, said device comprising:
a mounting ring adapted to be secured to said microscope;
means for placing a reference mark on said microscope slide;
means for attaching said marking means to said mounting ring;
means for rotating said marking means about a substantially vertical axis whereby said reference mark may be placed on said slide at a variable, preselected position; and
means for rotating said mounting means about a substantially horizontal axis whereby said reference mark may be placed on said slide at a variable, preselected position, such that said reference mark may be placed on said slide at any variable, preselected position.

25. A reference marking device as recited in claim 24 wherein said horizontal axis rotating means includes means for selectively varying the position of rotation about the horizontal axis and means for biasing said marking means in a first rotational direction about the horizontal axis.

26. A reference marking device as recited in claim 25 wherein said vertical axis rotating means includes means for selectively varying the position of rotation about the vertical axis and means for biasing said marking means in a first rotational direction about the vertical axis.

27. A reference marking device as recited in claim 26 further comprising means for selectively locking said marking means in selected, variable positions about the horizontal axis and about the vertical axis.

28. A reference marking device as recited in claim 27 wherein said mounting ring includes a pair of spaced apart, outwardly extending mounting ears, and wherein said marking means includes an upwardly extending fin protruding between said mounting ears, and wherein said attaching means includes a clevis disposed between said mounting ears and having a pair of arms between which said fin extends, and wherein said horizontal axis rotating means includes a first pivot pin extending substantially horizontally through said clevis and said fin, and wherein said vertical axis rotating means includes a second pivot pin extending substantially vertically from said mounting ring through said clevis, and wherein said means for selectively varying the position of rotation about the horizontal axis includes a first pin threadably extending through one of said mounting ears and bearing a tapered or conical tip against which a first edge of said fin rests, and wherein said means for biasing said marking means in a first rotational direction about the horizontal axis includes a spring mounted on at least one of said mounting ears and bearing against a second edge of said fin, and wherein said means for selectively varying the position of rotation about the vertical axis includes a second pin threadably extending through one of said mounting ears and having an end adapted to bear against said clevis, and wherein said means for biasing said marking means in a first rotational direction about the vertical axis includes a spring mounted on said mounting ring and bearing against said clevis, and wherein said locking means includes a third pin threadably extending through one of said mounting ears whereby said third pin and said second pin are adapted to compress said fin between said clevis arms.

29. A reference marking device as recited in claim 24 wherein said vertical axis rotating means includes means for selectively varying the position of rotation about the vertical axis and means for biasing said marking means in a first rotational direction about the vertical axis.

30. A reference marking device as recited in claim 24 further comprising means for selectively varying the size of said reference mark.

31. A reference marking device as recited in claim 24 wherein said reference marking device is adapted to be disposed outside the field of view of the microscope except when said marking means places a reference mark on said microscope slide.

32. A reference marking device for identifying objects of interest on a microscope slide while observing the objects of interest through the microscope, said device comprising:
means for selectively placing a reference mark on said microscope slide;
means for mounting said marking means to the microscope;
means for rotating said marking means about a substantially vertical axis whereby said reference mark may be placed on said slide at a variable, preselected position; and
means for selectively locking said marking means in a selected, variable position about the vertical axis.

33. A reference marking device as recited in claim 32 further comprising means for rotating said marking means about a substantially horizontal axis whereby said reference mark may be placed on said slide at a variable, preselected position, such that said reference mark may be placed on said slide at any variable, preselected position.

34. A reference marking device as recited in claim 32 wherein said mounting means includes a pair of spaced apart mounting ears, wherein said marking means includes a substantially vertically disposed fin extending between said mounting ears, and wherein said rotating means includes means for rotating said fin relative to said mounting ears.

35. A reference marking device as recited in claim 32 further comprising means for biasing said marking means in a first rotational direction about the vertical axis.

36. A reference marking device as recited in claim 32 further comprising means for selectively varying the size of the reference mark.

* * * * *